United States Patent
Hur et al.

(10) Patent No.: US 7,844,780 B2
(45) Date of Patent: Nov. 30, 2010

(54) PRIORITY-BASED MEMORY PREFETCHER

(75) Inventors: Ibrahim Hur, Austin, TX (US); Calvin Lin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 11/933,457

(22) Filed: Nov. 1, 2007

(65) Prior Publication Data
US 2009/0119471 A1    May 7, 2009

(51) Int. Cl.
*G06F 13/28* (2006.01)
(52) U.S. Cl. .................................................... 711/137
(58) Field of Classification Search ........................ None
See application file for complete search history.

(56) References Cited

U.S. PATENT DOCUMENTS

2005/0091460 A1 * 4/2005 Rotithor et al. ............. 711/158
2006/0064532 A1 * 3/2006 Hur ............................. 710/309
2007/0005934 A1 * 1/2007 Rotithor et al. ............. 711/213

OTHER PUBLICATIONS

Memory Prefetching Using Adaptive Stream Detection, Ibrahim HUr, Calvin Lin, Dec. 2006, Procedding of the 39th Annual IEEE/ACM International Symposium on Microarchitecture.*
Ibrahim Hur, Calvin Lin, adaptive history based memory schedulers, Proceddings of the 37th International Symposium on Microarchitecture, Micro-37'04, 2004.*

* cited by examiner

*Primary Examiner*—Tuan V Thai
*Assistant Examiner*—Duc T Doan
(74) *Attorney, Agent, or Firm*—Dillon & Yudell LLP

(57) ABSTRACT

A method for preforming memory prefetching and scheduling prefetch commands inside the memory controller is disclosed. A set of prefetch commands is generated based on a stream of Read requests intended for a system memory, and the prefetch commands are stored in a low priority queue (LPQ). A set of regular commands is generated based on a stream of Read and Write requests intended for the system memory, and the regular commands are stored in a centralized arbiter queue. One of the prefetch commands is issued from the LPQ depending on the status of the other queues in the memory controller.

12 Claims, 2 Drawing Sheets

PRIORITY-BASED MEMORY PREFETCHER

CROSS REFERENCE TO RELATED APPLICATION

The present application is related to Ser. No. 11/933,456, entitled "PROBABILISTIC METHOD FOR PERFORMING MEMORY PREFETCHING," filed on even date, which is assigned to the assignee of the present application.

BACKGROUND OF THE INVENTION

1. Technical Field

The present invention relates to prefetching in general, and more particularly, to a method for performing prefetching. Still more particularly, the present invention relates to a method for performing memory prefetching using an adaptive stream detection scheme and adaptive scheduling.

2. Description of Related Art

Early prefetching techniques mainly focused on exploiting streaming workloads. While regular forms of spatial locality are relatively easy to predict, traditionally it has been difficult to exploit irregular patterns of spatial locality and it is even more difficult to exploit low amounts of spatial locality.

Recently, a class of aggressive prefetching techniques has arisen from the notion of Spatial Locality Detections. Those techniques track accesses to regions of memory so that spatially correlated data can be prefetched together. The main advantage of those techniques is their ability to exploit irregular forms of spatial locality. However, the main disadvantage is their reliance on massive tables that tends to occupy large chip area and consumes a lot of power.

Consequently, it would be desirable to provide an improved method for performing prefetching.

SUMMARY OF THE INVENTION

In accordance with a preferred embodiment of the present invention, a set of prefetch commands is generated based on a stream of Read requests intended for a system memory, and the prefetch commands are stored in a low priority queue (LPQ). A set of regular commands is generated based on a stream of Read and Write requests intended for the system memory, and the regular commands are stored in a centralized arbiter queue. One of the prefetch commands is issued from the LPQ depending on the status of the other queues in the memory controller.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

In accordance with a preferred embodiment of the present invention, a new technique is utilized to augment the effectiveness of a stream prefetcher. Such technique is based on two observations. First, memory intensive workloads with low amounts of spatial locality are likely to still contain many very short "streams" (as short as two consecutive cache lines). Second, a stream prefetcher can effectively prefetch those short streams if it only knows when to be aggressive.

To understand the second observation, recall that a stream prefetcher looks for accesses to k consecutive cache lines, at which point a $k+1^{st}$ cache line is prefetched, and prefetching continues until a useless prefetch is detected. Thus, the value of k determines the stream prefetcher's aggressiveness, and such value is typically fixed at design time. Even with a small value of k, a stream prefetcher does not fare well on short streams because the stopping criterion is a useless prefetch. For example, on a workload in which every stream is of length 2, a k=1 policy can successfully prefetch a second cache line of each stream, but each successful prefetch will be followed by a useless prefetch, so 50% of its prefetches is useless.

The present invention uses an Adaptive Stream Detection scheme to guide the aggressiveness of a prefetch policy that is based on the workload's observed amount of spatial locality, as measured by a stream length histogram (SLH). An SLH is a dynamically computed histogram that attributes each memory access to a particular stream length. For example, if an SLH indicates that 70% of memory requests are parts of streams of length 2 and that 30% of the memory requests are parts of streams of length 1, then an effective strategy will always prefetch a second cache line of a stream but never a third line. Thus, the Adaptive Stream Detection scheme can predict when to stop prefetching without incurring a useless prefetch.

Figure 1:
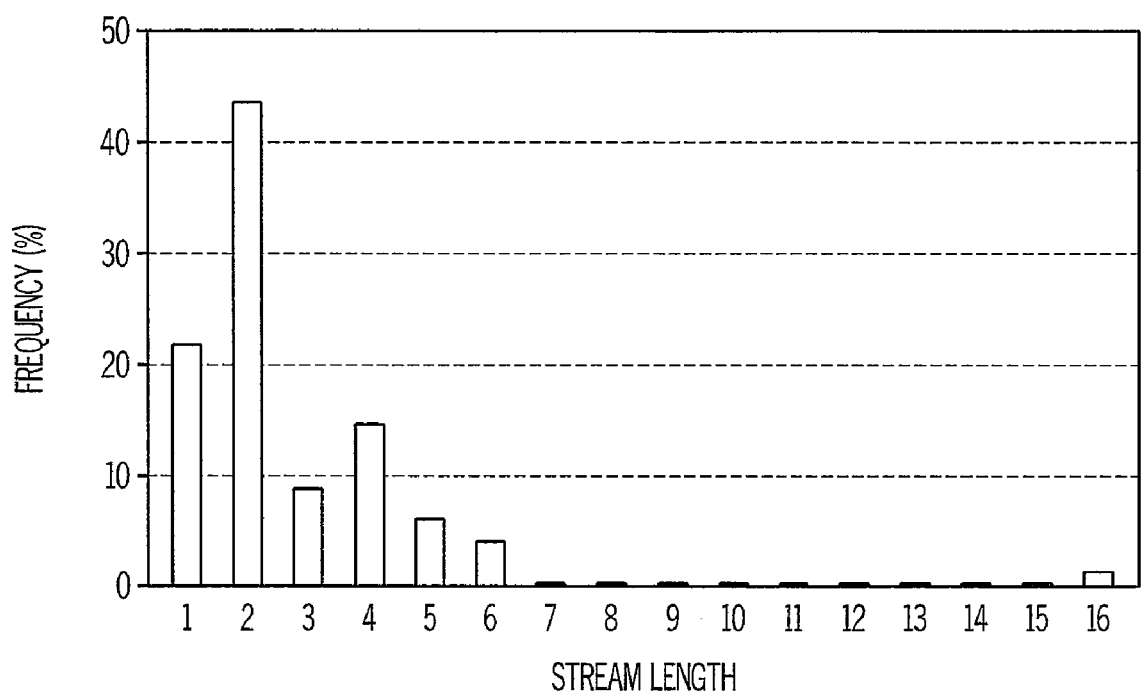
FIG. 1 is an example of a stream length histogram for one epoch of the GemsFDTD benchmark from the SPEC2006 suite.

With reference now to the drawings, and in particular to FIG. 1, there is depicted an example of an SLH for one epoch of the GemsFDTD benchmark from the SPEC2006 suite. As shown, the height of a bar at location m represents the number of Read commands that are part of a stream of length m. Depending on the detected stream length of the current Read request, a prefetcher checks the SLH and determines how many, if any, sequential cache lines needs to be prefetched.

In the example SLH of FIG. 1, 21.8% of all Read requests are part of streams of length 1, 43.7% of the Reads are part of streams of length 2, etc. The rightmost bar indicates that 1.2% of all Read requests are part of streams of length 16 or more. Given this information, when a Read request arrives and is the first element of a new stream, a prefetch request should be issued because it is more likely to be part of a stream of length 2 or longer (78.2% probability) than to be part of a stream of length 1 (21.8% probability). On the other hand, if a Read request is a second line of a stream, a prefetch should not be issued because there is a 43.7% probability that it is part of a stream of length 2, which is greater than the (100%−21.8%−43.7%=)34.5% likelihood that it is part of a longer stream. With similar reasoning, prefetches should be not issued for any Read request whose current stream length is 3 or greater than 6. This example shows that the use of an SLH allows a prefetcher to make rather sophisticated prefetching decisions based on the length of an individual stream.

A prefetcher can also use an SLH to decide whether to generate multiple prefetches. For example, when $R_n$ is part of a stream of length 1, a prefetcher decides whether to generate two consecutive prefetches by adding the probabilities of the first two bars and comparing the sum with the rest of the histogram. If the sum of the first two bars is less than the sum of the other bars, and if the prefetcher has already decided to prefetch one line, it generates a prefetch for the second line as well.

Because memory access behavior typically varies over time, an SLH is constructed periodically after every e Read requests, where e is known as an epoch. Thus, in every epoch, a new SLH is constructed for use in the next epoch.

Two functions, lht( ) and P( ), can be defined to be used to compute an SLH, as follows:
- lht(i): the number of Read requests that are part of streams of length i or longer, where $1 \leq i \leq fs$, and fs is the longest stream to be tracked. For any $i > fs$, lht(i)=0.
- P(i,j): the sum of probabilities that a Read request is part of any stream of length k, where $i \leq k \leq j$ and $1 \leq i,j \leq fs$. P(i,j) can be defined in terms of lht( ) as follows:

$$P(i,j) = [lht(i) - lht(j+1)]/lht(1) \quad (1)$$

The value of the $i^{th}$ bar (from FIG. 1) of an SLH equals P(i,i).

In order to decide whether or not to issue a prefetch, the following condition is checked to determine if it is satisfied for a Read request, $R_n$, that is the $i^{th}$ element of a stream:

$$P(i,i) < P(i+1, fs) \quad (2)$$

This inequality states that the probability that the most recent Read request, $R_n$, is part of a stream of length i is smaller than it being a part of a stream of length longer than i. Inequality (2) can be simplified as follows:

$$P(i, i) < P(i+1, fs) \quad (3)$$

$$\equiv \frac{lht(i) - lht(i+1)}{lht(1)} < \frac{lht(i+1) = lht(fs+1)}{lht(1)} \quad (4)$$

$$\equiv lht(i) < 2 \times lht(i+1) \quad (5)$$

Basically, inequality (5) can be utilized to make a next line prefetch decision. A generalized version of inequality (5) to prefetch k consecutive lines after a Read request $R_n$ can be as follows:

$$lht(i) < 2 \times lht(i+k) - lht(fs+1) \quad (6)$$

Figure 2:
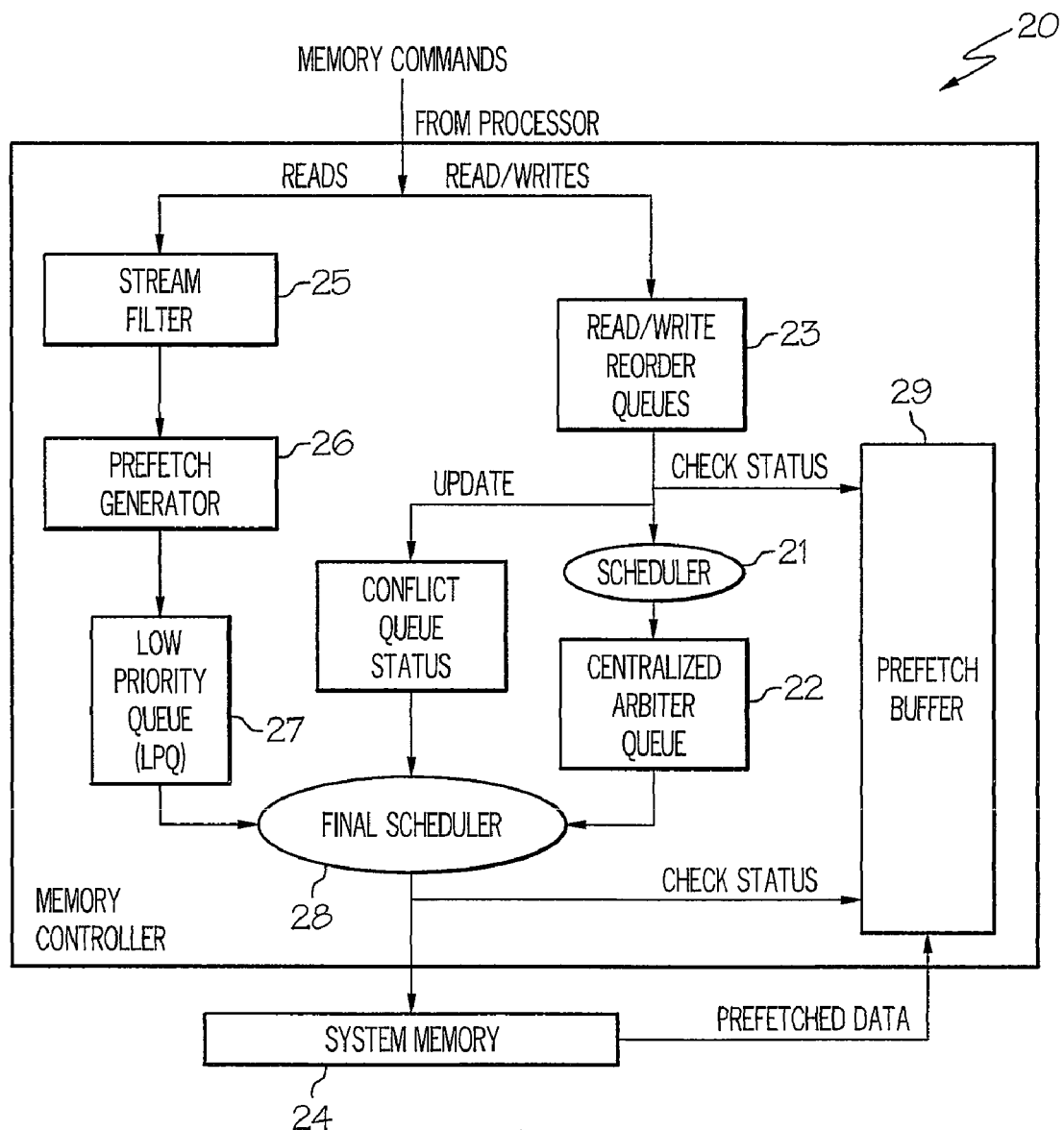
FIG. 2 is a block diagram of a memory controller having a prefetcher in which a preferred embodiment of the present invention is incorporated.

The Adaptive Stream Detection scheme, which uses SLH to capture spatial locality and guide prefetch decisions, can be implemented in a memory controller having a prefetcher. With reference now to FIG. 2, there is illustrated a block diagram of a memory controller having a prefetcher in which a preferred embodiment of the present invention is incorporated. As shown, a memory controller 20 includes a scheduler 21, a centralized arbiter queue (CAQ) 22 and multiple read/write reorder queues 23. Memory controller 20 is preferably located between cache memories and a system memory 24. Memory commands from the processor entering memory controller 20 are initially placed in reorder queues 23. On each cycle, scheduler 21 selects a command from reorder queues 23 and then sends the selected command to CAQ 22. In turn, CAQ 22 transmits commands to system memory 24 in a first-in-first-out manner.

Read commands entering memory controller 20 are sent to reorder queues 23 and to a stream filter 25. Stream filter 25 keeps track of Read streams and generates an SLH accordingly. The Read streams information from stream filter 25 is then fed to a prefetch generator 26 that decides whether a prefetch command should be issued. If a prefetch command should be fetched, a prefetch command is placed in a low priority queue (LPQ) 27 where a final scheduler 28 can consider the prefetch command along with other commands in LPQ 27 and CAQ 22 during the selection of commands to issue to system memory 24. Any prefetched data are then stored in a prefetch buffer 29.

Prefetch buffer 29 is first checked before Read commands are placed in CAQ 22 so that Read commands can be satisfied by prefetch buffer 29, in which case the latency of going to system memory 24 is saved and Read commands are squashed. Prefetch buffer 29 is checked again when final scheduler 28 selects a Read command from CAQ 22 to send to system memory 24. The second check is useful because the desired data may have arrived in prefetch buffer 29 while the Read command is resided in CAQ 22.

In order to maintain Read streams information, stream filter 25 uses one slot to track each Read stream. Each slot maintains the last address accessed by a Read stream, the length of the Read stream, the direction of the Read stream, and the lifetime of the Read stream (indicating when the Read stream should be evicted). These slots are used as follows.

If a Read request $R_n$ is not part of a Read stream and if there is a vacant slot in stream filter 25, the last access field is set to the address of the Read request, the length field is initialized to 1, the lifetime is initialized to a predetermined value, and the direction is set to Positive.

If a Read request $R_n$ is not part of a Read stream and there is no available slot, no prefetch will be generated after Read request $R_n$, but the SLH structure is updated as if a Read stream of length 1 had been detected.

If a Read request $R_n$ is the most recent element of a previously detected Read stream, the stream length is incremented by 1, the last access is set to the address of Read request $R_n$, and the lifetime of the stream is incremented by a predetermined value.

The direction of the Read stream is set to negative if the length of the previous stream is 1 and the address of Read request $R_n$ is smaller than the last address of the Read stream. At every processor cycle, the lifetime fields are decremented by one. A Read stream is evicted from a slot when its lifetime expires. At this point, the SLH structure is updated using the length value in stream filter 25. At the end of each epoch, all Read streams are evicted from stream filter 25.

Prefetch buffer 29 holds data that are fetched from system memory 24 by the memory-side prefetcher. Prefetch buffer 29 is assumed to be a set associative cache having an least-recently used replacement policy. When there is a Write request to an address in prefetch buffer 29, the entry in prefetch buffer 29 is invalidated. The entry is also invalidated if a regular Read request matches the address, because in such cases the data will likely be moved to the L1 or L2 cache, so it is unlikely to be useful in prefetch buffer 29 again.

For simplicity, the explanation on the SLH implementation is limited to streams with increasing addresses only, and to prefetching one cache line only. However, it is straightforward to generalize this approach to streams with decreasing addresses and multiple line prefetching.

Rather than implementing the SLH explicitly, the information in the SLH is constructed using two Likelihood Tables $LHT_{curr}$ and $LHT_{next}$. Both $LHT_{curr}$ and $LHT_{next}$ are of length fs and correspond to the lht( ) function discussed previously. A given epoch uses and updates information from $LHT_{curr}$ and gathers information for the start of the next epoch in $LHT_{next}$. $LHT_{next}$ is updated using the information from stream filter 25. When an entry of length k in stream filter 25 is invalidated, $LHT_{next}[i]$ is incremented by k, for all i, where $1 \leq i \leq k$. At the end of an epoch, $LHT_{next}$ is modified using the remaining valid entries in stream filter 25; the contents of $LHT_{next}$ are moved to $LHT_{curr}$; and $LHT_{next}$ is re-initialized. Each entry of $LHT_{curr}$ and $LHT_{next}$ is a $\log_2(m)$ bit counter, where m is the maximum epoch length.

$LHT_{curr}$ is used to make prefetch decisions for the current epoch. $LHT_{curr}$ table has one comparator for each pair of consecutive table entries, i.e., $LHT_{curr}[i]$ and $LHT_{curr}[i+1]$, for $1 \leq i \leq fs$. At the beginning of an epoch, the contents of $LHT_{curr}$ are used to construct an SLH. As the epoch progresses, this information is modified using the observed stream lengths of the current epoch. When an entry of length k in stream filter 25 is invalidated, the value of $LHT_{curr}[i]$ is decremented by k, for all i, where $1 \leq i \leq k$.

When stream filter 25 observes that a Read request is part of a stream of length k, prefetch requests are generated using the output of the comparison of $LHT_{curr}[k]$ and $LHT_{curr}[k+1]$, as in inequality (5). Instead of multiplying $LHT_{curr}[k+1]$ by 2, for any k, the comparator for the $(LHT_{curr}[k], LHT_{curr}[k+1])$ pair takes the left shifted value of $LHT_{curr}[k+1]$ as input.

When comes to selecting commands, final scheduler 28 have to decide whether a prefetch command from LPQ 27 or a regular command from CAQ 22 has a higher priority. Since prefetch commands are speculative in nature; thus, prefetch commands should be given a lower priority than regular commands. However, because memory systems are becoming increasingly complex, and because final scheduler 28 must make decisions with effects that may not be seen until many processor cycles later, it is not obvious what policy provides the best performance for a specific memory system. For example, a conservative policy that always gives prefetch commands lower priority than regular commands may unnecessarily block prefetch commands behind regular commands that cannot be issued due to conflicts within a memory system.

Rather than dictating a particular policy at design time, the present invention employs an Adaptive Scheduling scheme that uses feedback to dynamically select from one of the following five policies listed in order of decreasing conservativeness:

Only issue a prefetch command from LPQ 27 if
  i. CAQ 22 is empty and reorder queues 23 are empty;
  ii. CAQ 22 is empty and reorder queues 23 have no issuable commands;
  iii. CAQ 22 is empty;
  iv. CAQ 22 has only one entry and LPQ 27 is full;
  v. the first entry of LPQ 27 has an earlier timestamp than the first entry of CAQ 22.

To choose from among the above-stated policies, memory controller 20 tracks the number of times that a regular command in reorder queues 23 cannot proceed to CAQ 22 because it conflicts in the memory system with a previously issued prefetch command. As the occurrences of conflicts grows (or shrinks), the policy can be made more (or less) conservative.

The above-mentioned policies are adjusted using the same epoch size that is used to compute SLHs. Thus, this approach determines the priority of prefetch commands based on a measure of memory system performance, rather than on some instantaneous property such as occupancy of a queue.

As has been described, the present invention provides a method for performing memory prefetching using an Adaptive Stream Detection scheme. The method of the present invention provides two benefits. First, it extends the notion of a stream to include streams as short as two cache lines. Thus, while it is inherently a stream-based approach, it provides benefits for workloads, such as commercial applications, that are not traditionally viewed as stream-based. Second, because it is stream-based, it has low hardware costs, and smaller tables that have low static power leakage can be used.

While an illustrative embodiment of the present invention has been described in the context of a fully functional memory controller, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for performing memory prefetching, said method comprising:
   generating a plurality of prefetch commands based on a stream of Read requests intended for a system memory;
   storing said plurality of prefetch commands in a low priority queue (LPQ);
   generating a plurality of regular commands based on a stream of Read and Write requests intended for said system memory;
   storing said plurality of regular commands in a plurality of reorder queues and a centralized arbiter queue (CAQ); and
   issuing one of said prefetch commands from said LPQ depending on status of said reorder queues and said CAQ, wherein said method further includes issuing one of said prefetch commands if a first entry of said LPQ has an earlier timestamp than a first entry of said CAQ.

2. The method of claim 1, wherein said method further includes issuing one of said prefetch commands if said CAQ is empty and said reorder queues have no issuable commands.

3. The method of claim 1, wherein said method further includes issuing one of said prefetch commands if said CAQ is empty.

4. The method of claim 1, wherein said method further includes issuing one of said prefetch commands if said CAQ has only one entry and said LPQ is full.

5. A computer non-transitional storage medium having a computer program product for performing memory prefetching, said computer readable medium comprising:
   computer program code for generating a plurality of prefetch commands based on a stream of Read requests intended for a system memory;
   computer program code for storing said plurality of prefetch commands in a low priority queue (LPQ);
   computer program code for generating a plurality of regular commands based on a stream of Read and Write requests intended for said system memory;
   computer program code for storing said plurality of regular commands in a plurality of reorder queues and a centralized arbiter queue (CAQ); and computer program code for issuing one of said prefetch commands from said LPQ depending on status of said reorder queues and said CAQ, wherein said computer storage medium further includes computer program code for issuing one of said prefetch commands if a first entry of said LPQ has an earlier timestamp than a first entry of said CAQ.

6. The computer storage medium of claim 5, wherein said computer storage medium further includes computer program code for issuing one of said prefetch commands if said CAQ is empty and said reorder queues have no issuable commands.

7. The computer storage medium of claim 5, wherein said computer storage medium further includes computer program code for issuing one of said prefetch commands if said CAQ is empty.

8. The computer storage medium of claim 5, wherein said computer storage medium further includes computer program code for issuing one of said prefetch commands if said CAQ has only one entry and said LPQ is full.

9. A memory controller comprising:
a plurality of reorder queues;
a low priority queue (LPQ) for storing said plurality of prefetch commands;
a plurality of reorder queues and a centralized arbiter queue (CAQ) for storing said plurality of regular commands; and
a final scheduler for issuing one of said prefetch commands from said LPQ depending on status of said reorder queues and said CAQ, wherein said final scheduler issues one of said prefetch commands if a first entry of said LPQ has an earlier timestamp than a first entry of said CAQ.

10. The memory controller of claim 9, wherein said final scheduler issues one of said prefetch commands if said CAQ is empty and said reorder queues have no issuable commands.

11. The memory controller of claim 9, wherein said final scheduler issues one of said prefetch commands if said CAQ is empty.

12. The memory controller of claim 9, wherein said final scheduler issues one of said prefetch commands if said CAQ has only one entry and said LPQ is full.

* * * * *